US011541459B2

(12) United States Patent
Ufton

(10) Patent No.: US 11,541,459 B2
(45) Date of Patent: Jan. 3, 2023

(54) MODULE FOR ADDITIVE MANUFACTURING APPARATUS

(71) Applicant: RENISHAW PLC, Wotton-under-Edge (GB)

(72) Inventor: Jake Samuel Ufton, Uttoxeter (GB)

(73) Assignee: RENISHAW PLC, Wotton-under-Edge (GB)

(*) Notice: Subject to any disclaimer, the term of this patent is extended or adjusted under 35 U.S.C. 154(b) by 1409 days.

(21) Appl. No.: 15/516,244

(22) PCT Filed: Oct. 7, 2015

(86) PCT No.: PCT/EP2015/073159
§ 371 (c)(1),
(2) Date: Mar. 31, 2017

(87) PCT Pub. No.: WO2016/055523
PCT Pub. Date: Apr. 14, 2016

(65) Prior Publication Data
US 2017/0239725 A1    Aug. 24, 2017

(30) Foreign Application Priority Data
Oct. 7, 2014    (GB) ..................... 1417687

(51) Int. Cl.
*B29C 64/153*    (2017.01)
*B29C 64/255*    (2017.01)
(Continued)

(52) U.S. Cl.
CPC .......... *B22F 12/00* (2021.01); *B23K 26/0643* (2013.01); *B23K 26/0648* (2013.01);
(Continued)

(58) Field of Classification Search
None
See application file for complete search history.

(56) References Cited

U.S. PATENT DOCUMENTS

| 5,658,412 A | 8/1997 | Retallick et al. |
| 6,042,774 A | 3/2000 | Wilkening et al. |

(Continued)

FOREIGN PATENT DOCUMENTS

| CN | 1794422 A | 6/2006 |
| CN | 203580143 U | 5/2014 |

(Continued)

OTHER PUBLICATIONS

Jun. 1, 2018 Office Action issued in Chinese Patent Application No. 201580067166.8.
(Continued)

*Primary Examiner* — Joseph S Del Sole
*Assistant Examiner* — Baileigh Kate Darnell
(74) *Attorney, Agent, or Firm* — Oliff PLC

(57) ABSTRACT

This invention concerns a module for insertion into an additive manufacturing apparatus. The module comprising a frame mountable in a fixed position in the additive manufacturing apparatus, the frame defining a build chamber and a dosing chamber. A build platform is movable in the build chamber for supporting a powder bed during additive manufacturing of a part. A dosing piston is movable in the dosing chamber to push powder from the dosing chamber. A mechanism mechanically links the build platform to the dosing piston such that downward movement of the build platform in the build chamber results in upward movement of the dosing piston in the dosing chamber.

16 Claims, 7 Drawing Sheets

(51) Int. Cl.
  *B22F 10/28* (2021.01)
  *B22F 12/00* (2021.01)
  *B33Y 30/00* (2015.01)
  *B29C 64/232* (2017.01)
  *B33Y 10/00* (2015.01)
  *B33Y 50/02* (2015.01)
  *B23K 26/082* (2014.01)
  *B23K 26/342* (2014.01)
  *B23K 26/70* (2014.01)
  *B23K 26/06* (2014.01)
  *B23K 26/08* (2014.01)
  *B22F 10/10* (2021.01)

(52) U.S. Cl.
  CPC .......... *B23K 26/082* (2015.10); *B23K 26/083* (2013.01); *B23K 26/0876* (2013.01); *B23K 26/342* (2015.10); *B23K 26/702* (2015.10); *B29C 64/153* (2017.08); *B29C 64/232* (2017.08); *B33Y 10/00* (2014.12); *B33Y 30/00* (2014.12); *B33Y 50/02* (2014.12); *B22F 10/10* (2021.01); *B22F 2998/10* (2013.01); *Y02P 10/25* (2015.11)

(56) References Cited

U.S. PATENT DOCUMENTS

| | | | |
|---|---|---|---|
| 7,351,051 | B2 | 4/2008 | Hagiwara |
| 8,845,319 | B2 | 9/2014 | Oberhofer et al. |
| 9,205,600 | B1 * | 12/2015 | Kerr .................. B29C 64/20 |
| 2004/0045941 | A1 | 3/2004 | Herzog et al. |
| 2011/0252618 | A1 | 10/2011 | Diekmann et al. |
| 2011/0278773 | A1 | 11/2011 | Bokodi et al. |
| 2012/0195994 | A1 * | 8/2012 | El-Siblani .............. B33Y 10/00 425/174.4 |
| 2016/0001509 | A1 * | 1/2016 | Long .................. B23K 15/0086 700/98 |
| 2016/0326880 | A1 * | 11/2016 | Slavens .................. B22F 3/1055 |

FOREIGN PATENT DOCUMENTS

| | | |
|---|---|---|
| DE | 102009020987 A1 | 11/2010 |
| EP | 2711110 A2 | 3/2014 |
| EP | 2732890 A2 | 5/2014 |
| JP | 2004-516166 A | 6/2004 |
| JP | 2011-225994 A | 11/2011 |
| WO | 2007/064946 A2 | 6/2007 |
| WO | 2010/007396 A1 | 1/2010 |
| WO | 2013/189617 A1 | 12/2013 |
| WO | 2014/037464 A1 | 3/2014 |
| WO | 2014/090510 A1 | 6/2014 |

OTHER PUBLICATIONS

Thomas Scientific, London, Great Britain, XP002751518.
Dec. 4, 2015 International Search Report issued in International Patent Application No. PCT/EP2015/073159.
May 22, 2015 Search Report issued in Great Britain Patent Application No. 1417687.9.

\* cited by examiner

MODULE FOR ADDITIVE MANUFACTURING APPARATUS

FIELD OF INVENTION

This invention concerns a module for an additive manufacturing apparatus and a methods of using the module. The invention has particular, but not exclusive, application to a module for reducing a build volume of a selective laser melting (SLM) or selective laser sintering (SLS) apparatus.

BACKGROUND

Selective laser melting (SLM) and selective laser sintering (SLS) apparatus produce objects through layer-by-layer solidification of a material, such as a metal powder material, using a high energy beam, such as a laser beam. A powder layer is formed across a powder bed in a build chamber by depositing a heap of powder adjacent to the powder bed and spreading the heap of powder with a wiper across the powder bed. A laser beam is then scanned across areas of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. An example of such a device is disclosed in U.S. Pat. No. 6,042,774.

A build volume is defined by the walls of the build chamber and the extent to which a build platform, supporting the powder bed, can be lowered into the build chamber. In certain circumstances, it may be desirable to change the size of the build volume. For example, when manufacturing small parts and/or manufacturing parts from expensive materials, such as gold, it may be desirable to reduce the build volume to reduce the time for the build and/or the amount of powder material that is required.

US2011/0278773 discloses a method of reducing the build volume comprising building walls for confining the powder to a smaller volume at the same time as building the part. An application device for applying powder layers is provided with an insert to reduce the working filed across which powder is applied.

DE102009020987 discloses a volume reducing element that can be inserted into the build chamber to reduce the volume available for the build. A subcarrier is also provided for supporting the powder bed, the subcarrier including a connector plate for connecting the subcarrier to the main support piston movable in the build chamber. A cover may be provided in a piston operated doser to reduce the volume of powder required to fill a supply chamber.

US2011/0252618, WO2013/189617 and EP2732890 also disclose arrangements in which elements are inserted in to a build chamber to reduce the available build volume.

SUMMARY OF INVENTION

According to a first aspect of the invention there is provided a module for insertion into an additive manufacturing apparatus, the module comprising a frame mountable in a fixed position in the additive manufacturing apparatus, the frame defining a build chamber and a dosing chamber; a build platform movable in the build chamber for supporting a powder bed during additive manufacturing of a part; a dosing piston movable in the dosing chamber to push powder from the dosing chamber; and a mechanism mechanically linking the build platform to the dosing piston such that downward movement of the build platform in the build chamber results in upward movement of the dosing piston in the dosing chamber.

In this way, both the build platform and the dosing piston may be moved by a common drive mechanism. For example, the module may be mountable in a larger, master build chamber of the additive manufacturing apparatus, the build platform of the module connectable to a drive mechanism for driving a master build platform of the master build chamber. The build platform may be connectable to the drive mechanism via the master build platform. Alternatively, movement of the build platform may be driven by a drive mechanism separate from the drive mechanism for driving the master build platform.

The mechanism mechanically linking the build platform to the dosing piston may be a gear mechanism. The gear mechanism may comprise one or more pinions arranged to engage two racks, one connected to the build platform and the other connected to the dosing piston such that movement of the build platform downwards drives rotation of the one or more pinions, which in turn drives upwards movement of the dosing piston. In one embodiment, the gear mechanism comprises a single pinion. In such an embodiment, the gear mechanism may move the dosing piston upwards by an amount equal to the movement of the build platform downwards.

In an alternative embodiment, the gear mechanism comprises two pinions mounted about a common axis, one of the pinions engaged with the rack connected with the build platform and the other pinion engaged with the rack connected to the dosing piston so as to form a pair of rack and pinion mechanisms. A gearing of the pair of rack and pinions may be arranged such that the distance moved by the dosing piston is not equal to the distance moved by the build platform. Such an arrangement may allow the dosing chamber to dose sufficient powder for a layer, even of the dosing chamber has the same or a smaller cross-sectional area to the build chamber.

A start positon of a dosing head of the dosing piston in the dosing chamber may be adjustable. This may allow the user to adjust the volume of powder to be dosed by the dosing mechanism.

A cross-sectional area of the dosing chamber may be greater than a cross-sectional area of the build chamber. Spreading of the powder from the dosing mechanism across the powder bed in the build chamber is typically not 100% efficient.

Furthermore, solidification of the powder may result in the solidified areas occupying a smaller volume than the powder from which the solidified area is formed. By providing a dosing chamber with a larger cross-sectional area, the powder supplied for a layer by the dosing mechanism will be slightly greater than that required to form a layer across the powder bed to take into account loss of powder as the powder is spread and shrinkage of solidified areas of the previous layer.

Alternatively or additionally, the mechanism mechanically linking movement of the build chamber to movement of the dosing piston may be arranged such that, for a movement of the build platform downwards, the dosing piston is moved upwards by a greater distance.

The frame may further define a hopper for capturing excess powder that is spread beyond the build chamber.

According to a second aspect of the invention there is provided a module for insertion into a master build chamber of an additive manufacturing apparatus, the module comprising a frame mountable in a fixed position in the master build chamber, the frame defining a secondary build chamber and a dosing chamber; a secondary build platform movable in the secondary build chamber for supporting a powder bed during additive manufacturing of a part; and a dosing piston movable in the dosing chamber to push powder from the dosing chamber.

The secondary build platform and dosing piston may be arranged to be mechanically linked to a drive mechanism for driving movement of a master build platform in the master build chamber. The secondary build platform and dosing piston may be arranged to be mechanically linked to the master build platform such that downward movement of the master build platform results in downward movement of the secondary build platform in the secondary build chamber and upward movement of the dosing piston in the dosing chamber.

According to a third aspect of the invention there is provided a method of building a part using additive manufacturing comprising inserting a module according to the first or second aspect of the invention in an additive manufacturing apparatus and building the part in the build chamber of the module.

The part may be a dental component, jewellery or other small part that may benefit from being manufactured in a smaller build volume than is conventionally provided in an additive manufacturing apparatus.

According to a fourth aspect of the invention there is provided an additive manufacturing apparatus comprising a module according to the first or second aspect of invention mounted therein.

According to a fifth aspect of the invention there is provided an additive manufacturing apparatus comprising a build chamber; an elevator movable in the build chamber, the elevator arranged such that a build substrate can be releasably secured thereto, a powder dispenser for depositing successive layers of powder onto the build substrate as the build substrate is lowered by the elevator, a device for generating a high energy beam, a steering device for steering the high energy beam onto the layers to selectively consolidate areas of each layer to form an object, wherein the build substrate is releasably securable to the elevator via a fastener, the fastener accessible for releasing the substrate from the elevator from a surface other than that/those of the build substrate on which the layers are deposited by the powder dispenser.

In this way, an area of the surface, such as an upper surface, of the build substrate available for a build is not limited by the need to access fasteners, such as bolts, via that surface of the build substrate. This may allow larger parts to be built within the pre-set build volume and obviate the requirement for the user to consider the location of the fasteners when designing the build. At least the surfaces of the build substrate on which layers are deposited may be made of a material to which the powder adheres to when consolidated. For example, the surface of the build substrate may be made of the same material as the powder. The elevator may comprise a build platform to which the build substrate is releasably secured.

The elevator and/or build substrate may comprise at least one projection that is received in a cavity in the other of the elevator or build substrate, wherein the fastener is arranged such that the fastener can enter into the cavity and engage the projection to secure the build substrate to the elevator. The projection may comprise a recess for receiving the fastener. The recess may be suitably shaped, for example comprising an inclined surface, such that engagement of the surface by an end of the fastener draws the build substrate towards the elevator.

According to a sixth aspect of the invention there is provided a build substrate for use in an additive manufacturing apparatus according to the fifth aspect of the invention, the build substrate comprising a fastener for releasably securing the build substrate to the elevator of the additive manufacturing apparatus, the fastener accessible for releasing the substrate from the elevator from a surface other than that/those of the build substrate on which the powder is deposited by the powder dispenser of the additive manufacturing apparatus.

DESCRIPTION OF EMBODIMENTS

Figure 1:
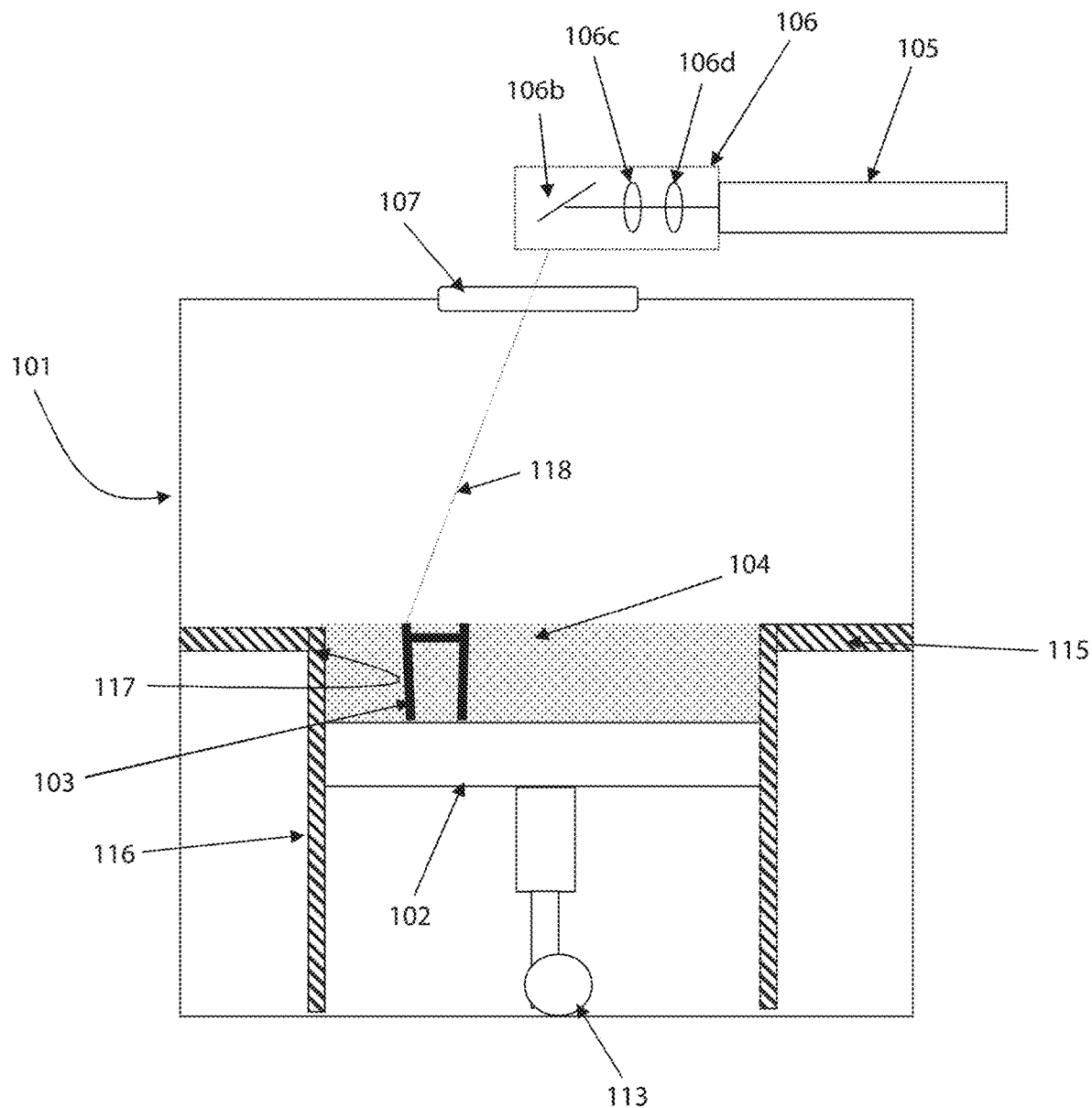
FIG. 1 is a schematic of an additive manufacturing apparatus.
Figure 2:
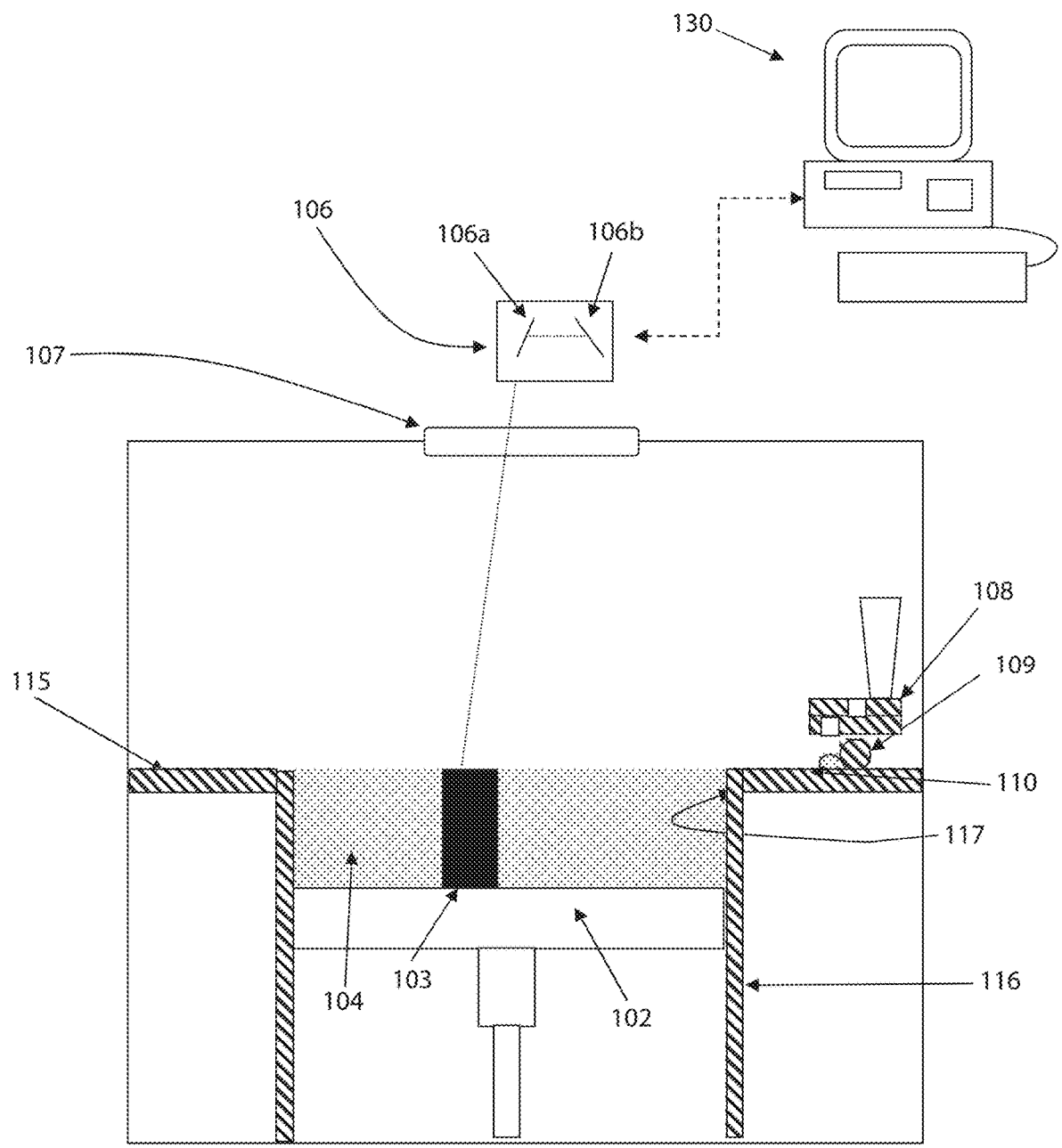
FIG. 2 is a schematic view of the additive manufacturing apparatus shown in FIG. 1 from another side.

Referring to FIGS. 1 and 2, an additive manufacturing apparatus comprises a main chamber 101 having therein partitions 115, 116, which define a master build chamber 117 and a surface 110 onto which powder can be deposited. A master build platform 102 is provided for supporting a powder bed 104 and an object/objects 103 built by selective laser melting powder 104. The master build platform 102 can be lowered within the master build chamber 117 by a drive mechanism, such as a motor 113, as successive layers of the object 103 are formed. A build volume available is defined by the extent to which the master build platform 102 can be lowered into the master build chamber 117.

The build progresses by successively depositing layers of powder across the powder bed 104 using dispensing apparatus 108 for dosing the powder onto surface 110 and an elongate wiper 109 for spreading the powder across the bed 104. For example, the dispensing apparatus 108 may be apparatus as described in WO2010/007396. The wiper 109 moves in a linear direction across the build platform 102.

A laser module 105 generates a laser for melting the powder 104, the laser directed as required by optical scanner 106 under the control of a computer 130. The laser beam 118 enters the chamber 101 via a window 107. In this embodiment, the laser module 105 is a fibre laser, such as an nd:YAG fibre laser.

The optical scanner 106 comprises steering optics, in this embodiment, two movable mirrors 106a, 106b for directing the laser beam to the desired location on the powder bed 104 and focusing optics, in this embodiment a pair of movable lenses 106c, 106d, for adjusting a focal length of the laser beam. Motors (not shown) drive movement of the mirrors 106a, 106b and lenses 106c, 106d, the motors controlled by computer 130.

Referring to FIGS. 3 to 7 a module according to an embodiment of the invention comprises a frame 201 capable of being inserted into the master build chamber 117 of the additive manufacturing apparatus. A lip 202 of the frame 201 is arranged to extend beyond an upper opening of the build chamber 117 over surface 110 such that the frame 201 is fixed in position in the additive manufacturing apparatus. The frame 201 comprises downwardly extending walls 203 and 204 defining a build chamber 205 and a dosing chamber 206, respectively, and an overflow hopper 221 for capturing excess powder that is spread beyond the build chamber 205. The frame 201 may be a single unitary piece or formed from a series of separate parts secured together to form a single unit.

Figure 3:
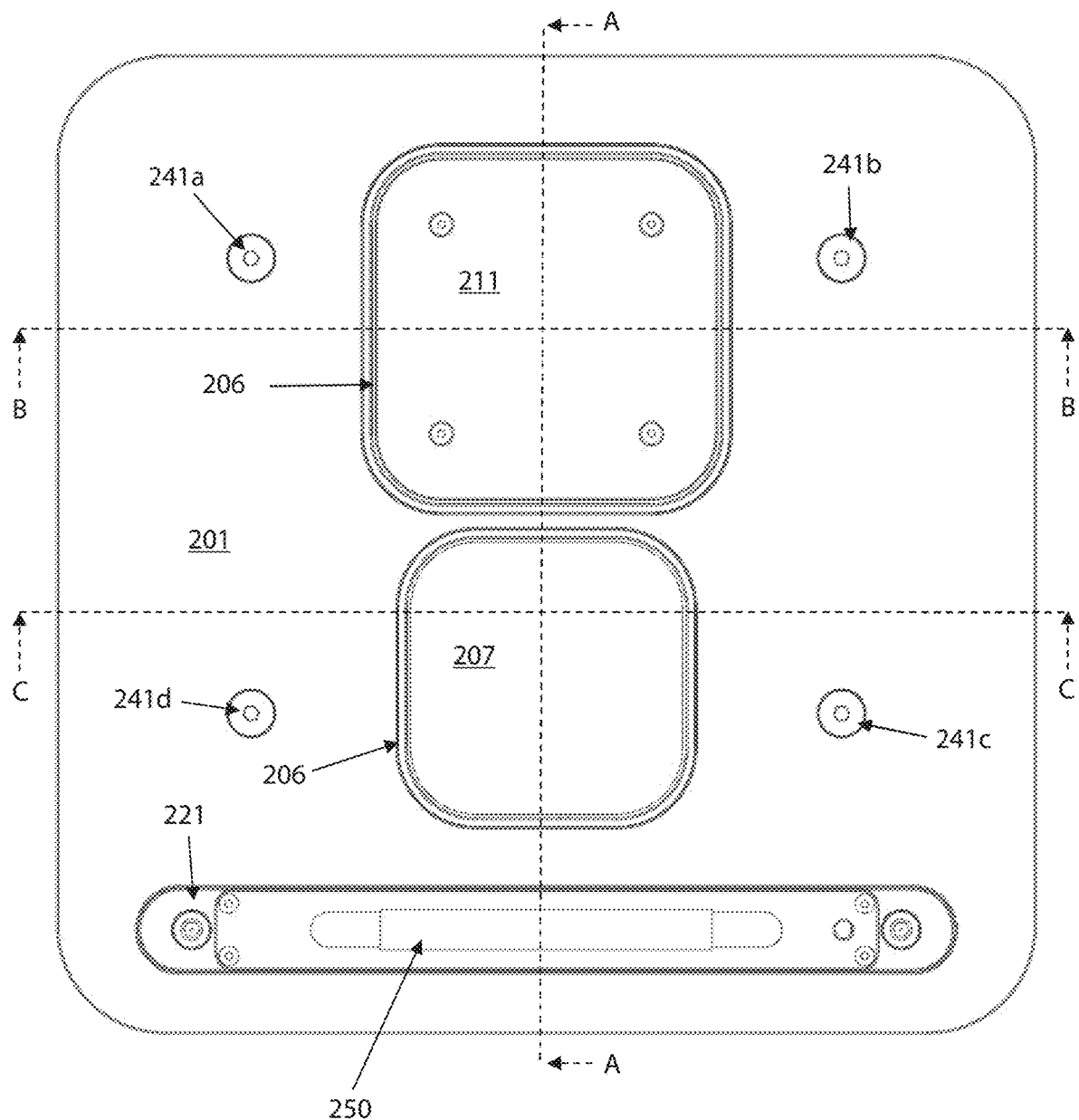
FIG. 3 is an elevated view of a module according to an embodiment of the invention.

As can be seen clearly from FIG. 3, a cross-sectional area of the dosing chamber 206 (in a horizontal plane) is greater than a corresponding cross-sectional area of the build chamber 205. In this embodiment, the cross-section of the dosing chamber 206 is the same rectangular shape but larger than the corresponding cross-section of the build chamber 205. However, it will be understood that, in other embodiments, the cross-sectional shape of the dosing chamber 206 and build chamber 205 may differ.

The module comprises a build platform 207 movable in the build chamber 205 supported by legs 208a, 208b, which in turn are mounted on a foot 209. The foot 209 has through holes for receiving bolts to attach the foot 209, and therefore, build platform 207 to master build platform 102 of the additive manufacturing apparatus. The build platform 207 comprises a seal 207a that seals the platform against the walls of the build chamber 117.

Figure 4:
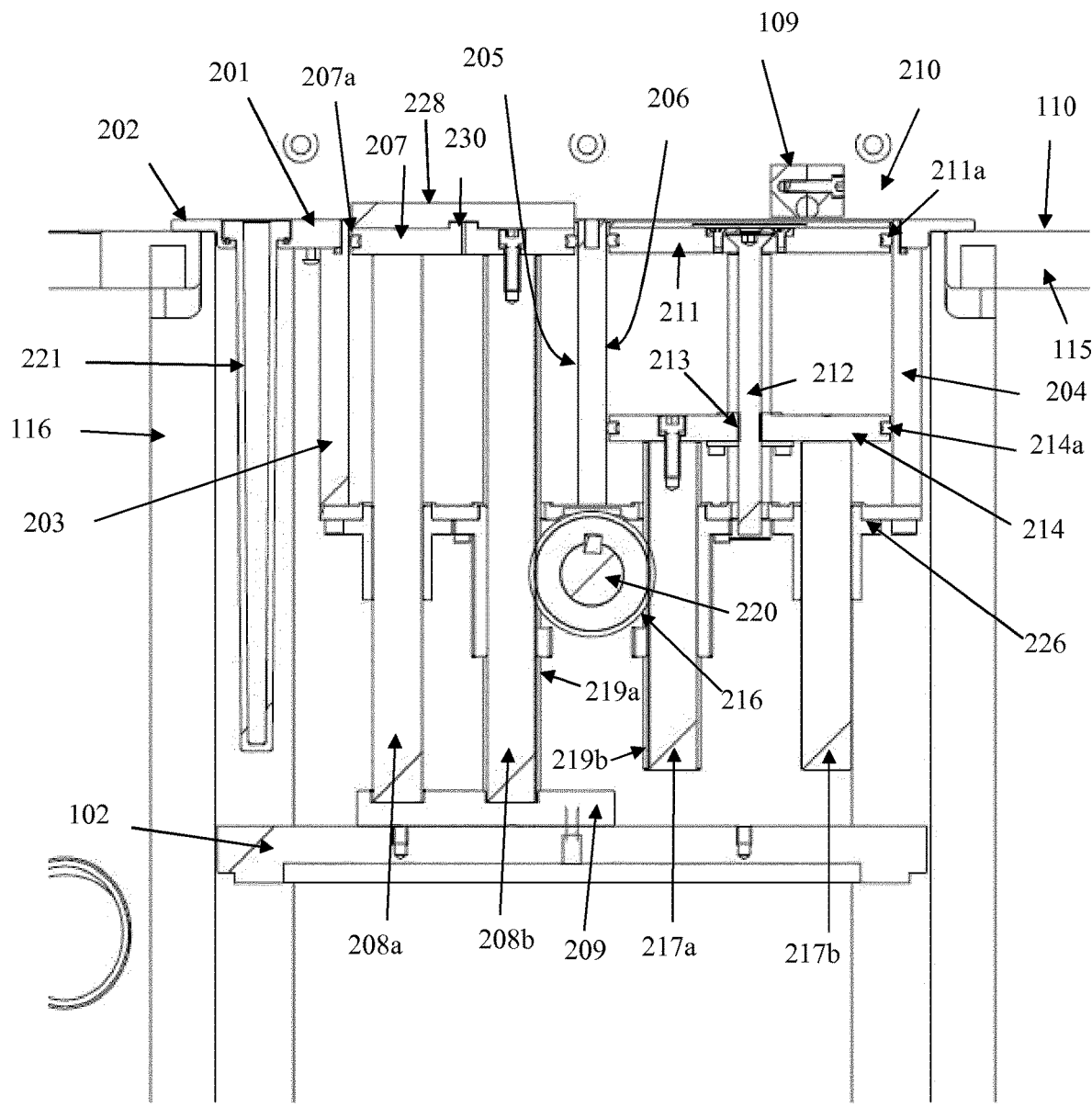
FIG. 4 is a cross-sectional view of the module shown in FIG. 3 along the line A-A mounted in an additive manufacturing apparatus.
Figure 5:
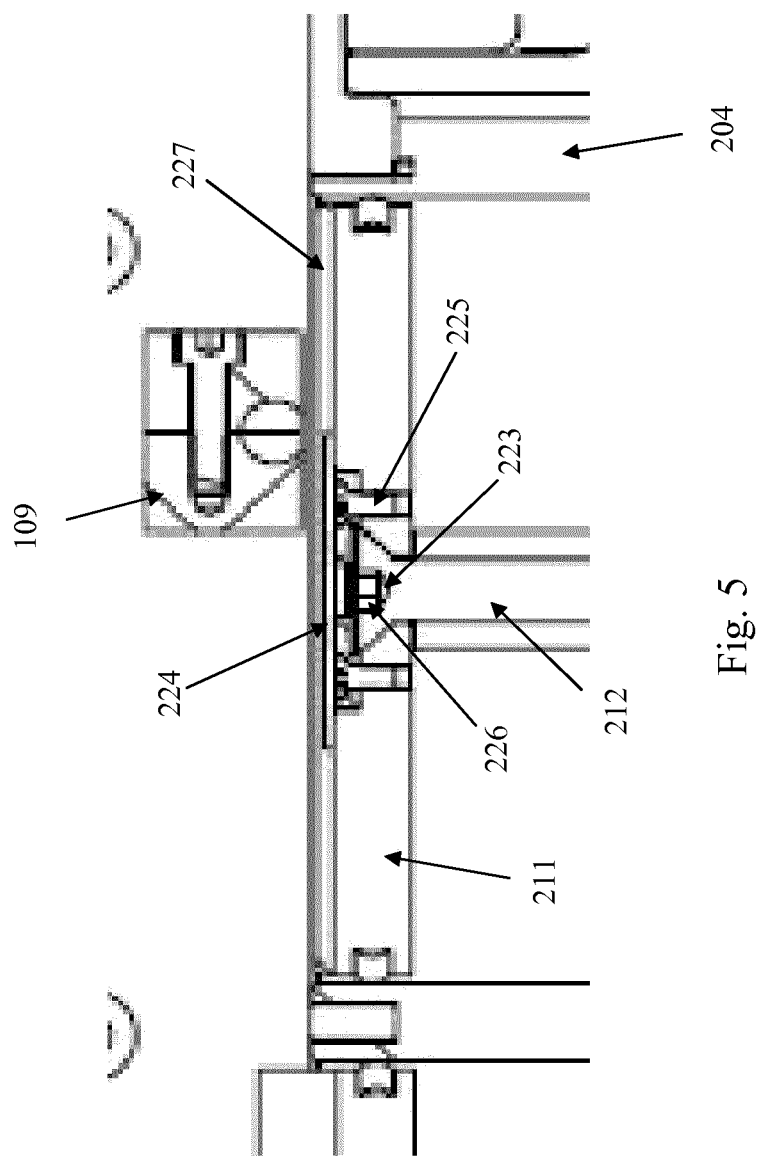
FIG. 5 is a magnified cross-sectional view along line A-A of the dosing head of a dosing piston of the module.
Figure 6:
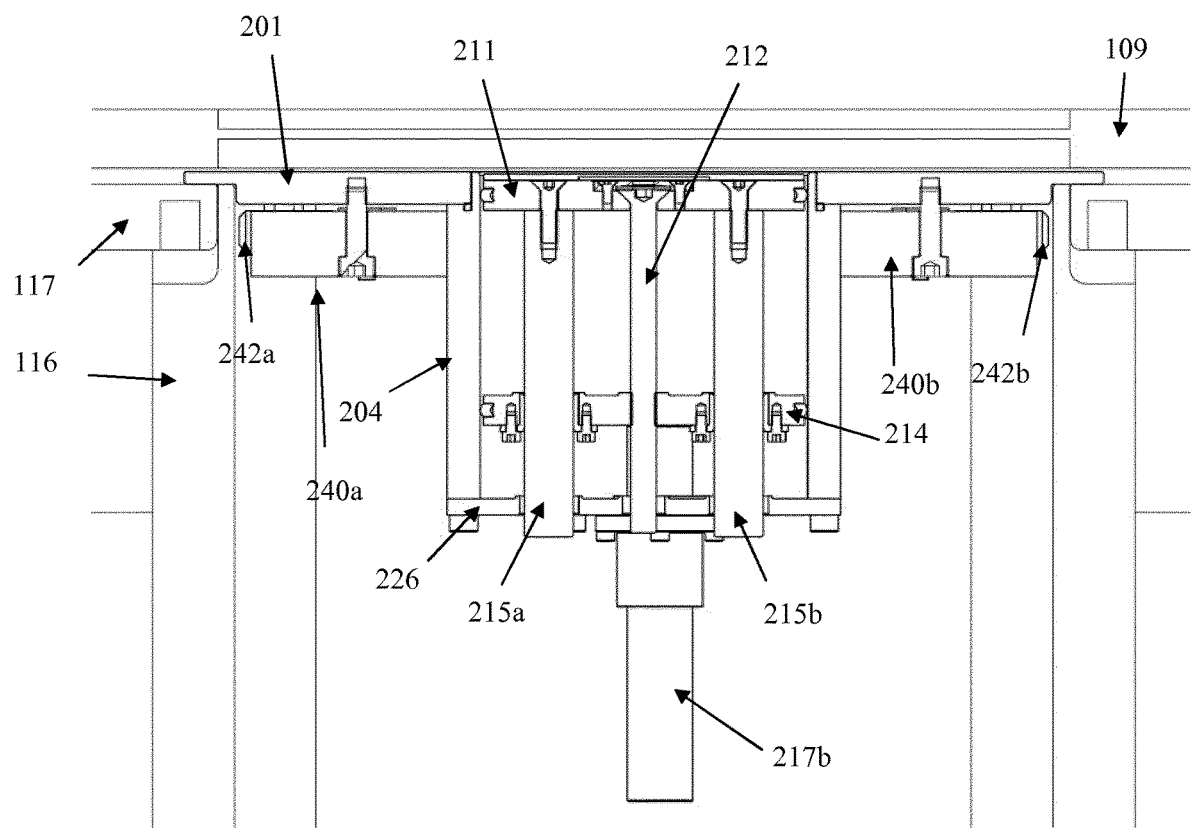
FIG. 6 is a cross-sectional view of the module shown in FIG. 3 along the line B-B.
Figure 7:
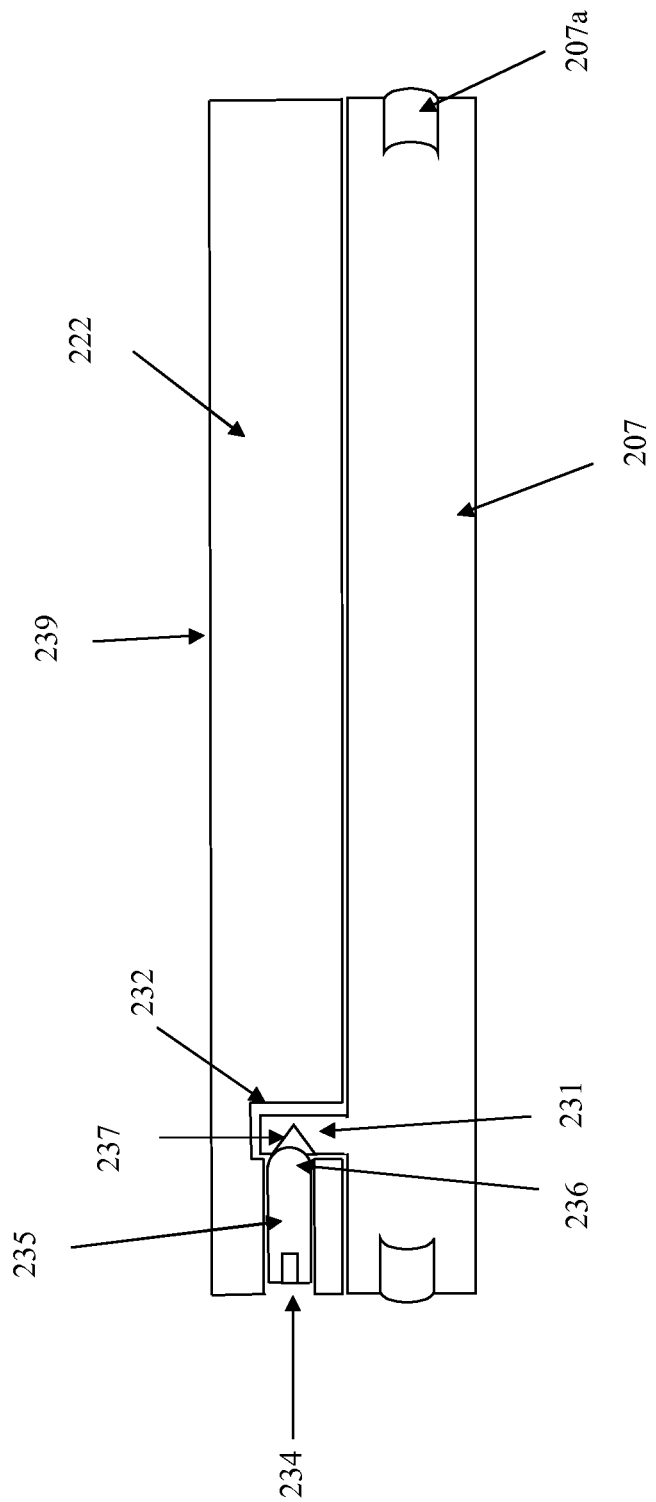
FIG. 7 is a cross-sectional view along the line C-C of the build substrate and build platform.

As shown in in FIGS. 4 and 7, the build platform 207 comprises a central, circular pin 230 and projections 231 (only one of which is shown) that extend upwardly from the platform 207. A build substrate 228 to be releasably secured to the build platform 207 comprises a central cavity for receiving pin 230 and cavities 232, offset from the centre of substrate 228, for receiving projections 231. The build substrate 228 comprises a threaded hole 234 for receiving threaded fastener 235. The hole 234 opens out to a side surface, rather than upper surface 329, of the build substrate 228. The fastener 235 has a dome shaped end 236 that can be engaged with an inclined surface of a recess 237 in projection 231 when the projection 231 is received in cavity 232.

The module further comprises a dosing piston 210 movable in the dosing chamber 206. The dosing piston 210 comprises an upper piston head 211 supported by a threaded connecting rod 212. Connecting rod 212 passes through a threaded aperture 213 in an annular setting head 214. The relative position of the upper piston head 211 to the setting head 214 can be adjusted by rotation of the connecting rod 212. Movement of the upper piston head 211 relative to the setting head 214 is guided by two guide shafts 215a, 215b either side of the connecting rod 212. The head of the connecting rod 212 comprises a chamfered recess 223 therein and the upper piston head 211 comprises four threaded holes. To prevent rotation of the connecting rod 212 during a build, a clamping plate 224 is secured to the upper piston head 211 using bolts 225 that engage the threaded holes. The clamping plate 224 comprises a protrusion 226 that engages the chamfered recess 223 such that, when the clamping plate 224 is secured in place, friction between the protrusion 226 and the recess 223 acts to prevent rotation of the connecting rod 212.

Both the upper piston head 211 and setting head 214 comprise seals 211a, 214a to seal the heads 211, 214 against the walls 204 of the dosing chamber 206. The setting head 214 comprises a pair of legs 217a, 217b. A bearing plate 226 connected to the bottom of each of the build chamber 205 and dosing chamber 206 provides bearings for guiding the legs 208a, 208b, 217a, 217b during movement of the build platform 207 and dosing piston 210.

Each one of leg 208b and leg 217a comprises a rack of teeth 219a, 219b that engage teeth 216 on a pinion 220. This gear mechanism mechanically links the build platform 207 to the dosing piston 210 such that downward movement of the build platform 207 in the build chamber 205 results in upward movement of the dosing piston 210 in the dosing chamber 206. In this way, both the build platform 207 and the dosing piston 210 are moved by movement of build platform 102.

The module further comprises four clamps (two 240a, 240b of which are shown) each comprising a movable abutment 242a, 242b for engaging a sidewall of the main build chamber 117. The abutments 242a, 242b are moved into a position engaging the sidewall of chamber 117 by rotation of screws 241a to 241d having threads that engage with complementary threads in frame 201. At the end of each screw 241a to 241d is a wedge shaped member (not shown) that engages with corresponding inclined surfaces (not shown). One of the inclined surfaces is fixed and the other inclined surfaces is movable with one of the abutments 242a, 242b such that movement of the screw 241a-241d into the frame 201 pushes the wedge shaped member against the inclined surfaces, pushing the inclined surfaces apart and therefore, the abutment 242a, 242b towards the sidewall of the build chamber 117. A biasing member, such as a spring or rubber band, may bias the inclined surfaces towards each other such that the abutment 242a, 242b is moved away from the sidewall under the biasing of the biasing member when the wedge shaped member is moved away from the inclined surfaces.

In use, the module is mounted in the master build chamber 117 to provide a reduced volume, secondary or slave build chamber 207 driven by the drive mechanism 113 of the master build platform 102. To mount the module in the additive manufacturing apparatus, the master build platform 102 is raised to the top of the master build chamber 117 and the foot 209 of the module attached to the build platform 102. The build platform 102 is then lowered to lower the module into the master build chamber 117 until lip 202 of frame 201 engages with surface 110. The user forces the abutments 241a, 241b against the side of the walls of build chamber 117 by actuating screws 242a to 242d to clamp the module in place in the build chamber 117.

The build substrate 228 is mounted on the build platform 207 by raising the build platform 228 to the top of the build chamber 205 and locating pin 230 in the central cavity and projections 231 in cavities 232 of the build substrate 228. The user than aligns the fasteners 235 with the recesses 237 in projections 231 such that tightening of the fasteners 235 forces ends 236 into the recesses 237 against the inclined surfaces. This action results in the build substrate 228 being pushed towards platform 207, securing the build substrate 228 thereto. With the build substrate 228 secured, the build platform 102 is lowered to locate an upper surface of the build substrate 226 level with the upper surface of frame 201.

The dosing piston 208 is then adjusted to set a start position of the upper dosing head 211 in the dosing chamber 206. The start position is set by rotating connecting rod 212 to move the upper dosing head 211 relative to setting head 214. The start position is set based upon the amount of powder required for the build, which in turn is set by a required depth of the powder bed when the build has been completed. The required depth will depend on the size and orientation of the parts being built. Once the upper dosing head 211 is positioned as desired, the clamping plate 224 is secured to maintain the connecting rod 212 in place. A thin, such as 2 mm, covering plate 227 is placed over the upper dosing head 211 to prevent powder from entering recesses on an upper surface of the upper dosing head 211.

Once the dosing head 211 has been located at the desired start position, powder can be loaded and the build commenced. This is achieved by lowering build platform 102 by the thickness of a layer, which in turn lowers build piston 207 and raises dosing piston 208. Wiper 109 is then actuated to spread the dosed powder, pushed above the upper surface of frame 201, across the build substrate 228 mounted on the build platform 207. Any excess powder is pushed into overflow hopper 221. Selected areas of the powder layer formed across the build substrate are then melted by steering the laser beam, under the control of a computer 130, to the selected areas. This process is then repeated for subsequent layers until the build is complete.

At the end of the build, the master build platform 102 is raised, raising the secondary build platform 207 to the top of secondary build chamber 205 such that the part can be removed and powder recovered. Unsolidified powder is recovered by the user brushing the powder into the hopper 221. A volume of the hopper 221 is equal to a maximum volume of powder that can be loaded into the dosing chamber 206. The hopper 221 can then be detached from the frame 201 for recovery of the powder. For example, a handle 250 can be attached to the hopper 221 for removal of the hopper 221. The handle comprises a hole 251 therein from which the powder can be poured, for example into a sieve, at the end of the build.

It will be understood that alterations and modifications can be made to the above described embodiment without departing from the scope of the invention as described herein. For example, rather than attaching the build platform 207 to the master build platform 102, the module may be provided with its own dedicated drive mechanism. Rather than a single pinion, the module may comprise two pinions connected on a common shaft, the gearing of the pinions arranged such that, for a distance moved downwards by the build platform 207, the dosing piston 206 is moved a greater distance upwards. Such an arrangement may be beneficial in ensuring that sufficient powder is dispensed to form a layer.

The invention claimed is:

1. A module for insertion into a master build volume of an additive manufacturing apparatus, the additive manufacturing apparatus comprising a master build chamber and a master build platform lowerable in the master build chamber to define the master build volume, the master build platform being lowerable by way of a drive mechanism, and the module comprising:
   a frame mountable in a fixed position in the additive manufacturing apparatus, the frame defining a secondary build chamber and a dosing chamber;
   a secondary build platform for supporting a powder bed during additive manufacturing of a part, the secondary build platform being movable in the secondary build chamber to define a secondary build volume smaller than the master build volume; and
   a dosing piston movable in the dosing chamber to push powder from the dosing chamber,
   wherein the secondary build platform is configured to be connected to the drive mechanism of the master build platform.

2. A module according to claim 1, wherein the secondary build platform of the module and the dosing piston are arranged to be mechanically linked to the drive mechanism for driving the master build platform of the master build chamber.

3. A module according to claim 2, wherein the secondary build platform is connectable to the drive mechanism via the master build platform.

4. A module according to claim 2, comprising a mechanism mechanically linking the secondary build platform to the dosing piston such that downward movement of the secondary build platform in the secondary build chamber results in upward movement of the dosing piston in the dosing chamber.

5. A module according to claim 4, wherein the mechanism mechanically linking the secondary build platform to the dosing piston is a gear mechanism.

6. A module according to claim 5, wherein the gear mechanism comprises one or more pinions arranged to engage a rack connected to the secondary build platform and a rack connected to the dosing piston such that movement of the secondary build platform downwards drives rotation of the one or more pinions, which in turn drives upwards movement of the dosing piston.

7. A module according to claim 6, wherein the one or more pinions of the gear mechanism comprise a single pinion that engages both the rack connected to the secondary build platform and the rack connected to the dosing piston.

8. A module according to claim 6, wherein the one or more pinions of the gear mechanism comprise two pinions mounted about a common axis, one of the pinions engaged with the rack connected with the secondary build platform and the other pinion engaged with the rack connected to the dosing piston so as to form a pair of rack and pinion mechanisms.

9. A module according to claim 8, wherein a gearing of the pair of rack and pinion mechanisms is arranged such that distance moved by the dosing piston is not equal to distance moved by the secondary build platform.

10. A module according to claim 4, wherein the mechanism mechanically linking the secondary build platform to the dosing piston is arranged such that, for a movement of the secondary build platform downwards, the dosing piston is moved upwards by a greater distance.

11. A module according to claim 1, wherein a start position of a dosing head of the dosing piston in the dosing chamber is adjustable.

12. A module according to claim 1, wherein a cross-sectional area of the dosing chamber is greater than a corresponding cross-sectional area of the secondary build chamber.

13. A module according to claim 1, wherein the frame further defines a hopper for capturing excess powder that is spread beyond the secondary build chamber.

14. A method of building a part using additive manufacturing, the method comprising:
   inserting a module according to claim 1 in an additive manufacturing apparatus; and
   building the part in the secondary build chamber of the module.

15. An additive manufacturing apparatus comprising a module according to claim 1.

16. A module for insertion into a master build volume of an additive manufacturing apparatus, the additive manufacturing apparatus comprising a master build chamber and a master build platform lowerable in the master build chamber to define the master build volume, the master build platform being lowerable by way of a drive mechanism, and the module comprising:
- a frame mountable in a fixed position in the additive manufacturing apparatus, the frame defining a secondary build chamber and a dosing chamber;
- a secondary build platform for supporting a powder bed during additive manufacturing of a part, the secondary build platform being movable in the secondary build chamber to define a secondary build volume smaller than the master build volume; and
- a dosing piston movable in the dosing chamber to push powder from the dosing chamber,
- wherein the secondary build platform is configured to be connected to the drive mechanism of the master build platform, and
- wherein the secondary build platform and the dosing piston are arranged to be mechanically linked to the master build platform such that downward movement of the master build platform results in downward movement of the secondary build platform in the secondary build chamber and upward movement of the dosing piston in the dosing chamber.

* * * * *